2,904,584
OXIDATION OF CYCLIC KETONES

George B. Payne, Berkeley, Calif., and George E. Hein, Ann Arbor, Mich., assignors to Shell Development Company, New York, N.Y., a corporation of Delaware No Drawing. Application March 5, 1956
Serial No. 569,255

9 Claims. (Cl. 260—484)

This invention relates to improvements in the process for production of alcohols, especially polyhydric alcohols. More particularly this invention relates to improved processes for the production of polyhydric alcohols obtained from the products of the oxidation of cycloketones.

It is known that certain cycloketones can be oxidized to produce aliphatic compounds but these known methods have disadvantages which have resulted in numerous processing steps with resultant high production costs. One of the common techniques for opening the cycloketone ring is by nitric acid oxidation. Other methods for opening a cycloketone ring involve the use of a multitude of various techniques in conjunction with nitric acid. Thus, U.S. 2,193,562 teaches that careful control of the nitric acid concentration in conjunction with controlled conditions of temperature and pressure will improve yields. Certain beneficial results are described in U.S. 2,291,211 if the reaction is additionally conducted in the presence of certain solvents. Other teachings describe the use of specific catalysts, the use of oxygen-containing gases in the reaction atmosphere, and the like.

Some of the various prior art processes have ultimately produced the desired products but the difficulties of processing leave much to be desired.

It is an object of this invention to provide improved methods for the preparation of aliphatic diols. It is another object of this invention to provide improved methods for the preparation of aliphatic intermediates from the oxidation of cycloketones for the production of aliphatic diols. It is yet another object of this invention to reduce processing steps with increased yields in the preparation of aliphatic diols. Other objects of this invention will appear hereinafter.

It has now been found that these and other objects are accomplished by a process for the oxidation of cyclic ketones which comprises treating a cyclic ketone of 4 to 10 ring carbon atoms with a lower organic peracid in the presence of a cationic ion exchange resin. The products thereby obtained may be further treated with an alcohol and additional cationic ion exchange resin and then hydrogenated to produce high yields of aliphatic diols based on the starting cyclic ketone.

By the use of cationic ion exchange resins several important processing advantages are achieved which have not heretofore been obtained. One of the major advantages of this process is that the acidic ion exchange resin may be removed by simple filtration or decantation thus eliminating prior neutralizing steps. It will be seen that by the elimination of chemical neutralization the commonly encountered difficulties attendant with such neutralization are avoided. This advantage is especially apparent when the reaction products are viscous or high boiling liquids. The matter of separating the catalyst makes the process economical as the catalyst may be used from as many as 5 to 10 times without regeneration. Another important advantage in the use of a cationic ion exchange resin as the catalyst is that the processes of this invention lend themselves to continuous operations whereby fixed beds of the catalyst may be employed. Still another advantage of this invention is that discoloration and degradation is greatly reduced, thus eliminating or reducing purification steps. It is even possible to distill rather high boiling reaction products directly from the cationic ion exchange resins without adverse effect. By the use of these resins, it will be readily understood that losses due to chemical corrosion and metal contamination are now minimized. As the cationic ion exchange resins are porous or have high surface area, rather small quantities may be used with high efficiency.

Acidic ion exchange resins that are readily available for the process of this invention include the following:

| Trade or Common Name | Type | Manufacturer or Supplier |
|---|---|---|
| Amberlite IR 100 | Modified phenol-formaldehyde sulphonic acid. | Rohm and Haas. |
| Amberlite IR 105 | do | Do. |
| Amberlite IR 112 | Polystyrenesulphonic acid. | Do. |
| Amberlite IR 120 | Sulphonated cross linked polystyrene. | Do. |
| Duolite C3 | Sulphonated phenol-formaldehyde. | Chemical Process Corp. |
| Dowex 30 | do | Dow Chemical Corp. |
| Dowex 50X | Sulphonated Polystyrene. | Do. |
| Nalcite MX | Sulphonated phenol-formaldehyde. | National Aluminate Corp. |
| Nalcite HCR | Sulphonated polystyrene. | Do. |
| Zeo-Karb 225 | Sulphonated cross linked polystyrene. | Do. |

It is preferred that the cationic ion exchange resin be of the type characterized as "strong" although it will be readily understood that others that are not as strong may be used but the results are less satisfactory due to reduced yields, longer reaction times, and the like.

The process of this invention may be applied to any cyclic ketone having 4 to 20 carbon atoms in a ring, i.e., cyclic ketones which may be represented by the formula:

$$\begin{pmatrix} \text{O} \\ \parallel \\ \text{C} \\ \text{A} \end{pmatrix}$$

wherein A is a divalent radical of 3 to 9 carbon atoms. Among such cyclic ketones are cyclobutanone, cyclohexanone, cyclooctanone, and cyclodecanone.

The initial reaction of the cyclic ketone is conducted in the presence of a peracid. Any lower organic peracid up to 6 carbon atoms may be used. This includes performic, peracetic, perpropionic and perbutyric acids, and the like. It is preferred, however, that those peracids of 2 to 4 carbon atoms be used as certain disadvantages result from using others. Thus, for example, performic acid has the disadvantage of producing potentially explosive mixtures while the higher peracids such as perhexanoic acid require unreasonably long reaction times as well as recovery problems. Particularly preferred is peracetic acid. The peracid used may be that which is obtained on the commercial market but it may be simply prepared in situ, prior to reaction with the cycloketone, by the addition of hydrogen peroxide to the corresponding organic acid. Thus, for example, when acetic acid and hydrogen peroxide are added to the reaction vessel, the active acid is peracetic acid. As used in the specification and the claims, the term "peracid" will be understood to mean that which may be obtained in situ as described above.

The products obtained from the reaction of the cyclic ketone and the peracid in the presence of the cationic ion exchange resin will normally be a mixture of omega-acyloxy alkyl acids, omega-hydroxyalkyl acids and dibasic acids having the same number of carbon atoms as the cyclic ketone. Thus, when cyclopentanone is reacted with peracetic acid in the presence of Amberlite IR-120, there is produced a mixture of omega-acetoxypentanoic acid, omega-hydroxypentanoic acid, and glutaric acid. In the like-manner, cyclohexanone yields a mixture of omega-acetoxyhexanoic acid, omega-hydroxyhexanoic acid and adipic acid. Where acids other than acetic acid are used the corresponding acyloxy acids are produced. It will hereinafter be observed that where the desired final product is the diol, which is ultimately obtained by esterification and hydrogenation, no useful purpose is accomplished by using peracids other than peracetic acid. The mixture of the reaction products initially obtained is further treated without separation as will presently appear.

The quantities of the initial reactants may be varied over a considerable range and are computed on the quantity of the cyclic ketone used. With the cyclic ketone as unity, the acetic acid may range from about 0.3 to 5 parts. However, it is found that about 2.5 parts is preferred in most cases. The quantity of hydrogen peroxide used may range from 1.0 to 1.5 and the preferred amount being about 1.2. It will be understood that in this case the peracid is being formed in situ.

The quantity of the cationic ion exchange resin may be varied over a considerably greater range as it does not participate in the reaction itself. Thus, there may be as little as 1% or as much as 100% or more based on the quantity of the cyclic ketone. However, it is apparent that certain disadvantages result from using extremely small or extremely large quantities of the catalyst. If too large a quantity is used, the size of the equipment required becomes unnecessarily expensive. Furthermore, handling of such large quantities becomes cumbersome, particularly when regeneration becomes necessary. Too little quantities will require frequent regeneration and replacement and cause the risk of lower yields. For these reasons, it is preferred that the cationic ion exchange resin be used in an amount from about 25 to 50% by weight of cyclic ketone.

The temperatures at which the initial reaction of the cyclic ketone and peracid, in the presence of the resin catalyst, is conducted may be varied with useful results within the range of 40 to 100° C. with 70 to 80° C. being preferred. It is found that temperatures from about 85 to 100° C. cause considerable decomposition of the peracid whereas temperatures substantially below 70° C. result in a mixed reaction product containing undesirable cyclic peroxides. Using the preferred range of 70 to 80° C., about 2 hours of reaction time is required. If temperatures in excess of 85° C. are used, considerably lesser time is required to complete the reaction, but as stated above, peracid decomposition occurs. If desired, atmospheric, superatmospheric or subatmospheric pressures may be used but superatmospheric or subatmospheric pressures are not desirable as they often increase production cost without any commensurate gain.

As the initial reactants are easily solubilized under the conditions of reaction, the use of solvents is eliminated. However, if desired, certain inert solvents such as lower saturated aliphatic hydrocarbons may be used as butane, pentane, hexane and the like. Other inert solvents include benzene, toluene, and the like.

Excess of acid, such as acetic acid, and water are then flashed from the reaction mixture whereupon the mixture of products thus obtained may be esterified without any further separation step. It is a principal advantage of this invention that the esterification may be conducted in the same reaction vessel without a separation step.

By subjecting the resulting mixture to the action of water in the presence of a cationic ion exchange resin, there results a mixture of hydroxy acid and dicarboxylic acid of 4 to 10 carbon atoms depending upon the number of carbon atoms in the initial cyclic ketone. The mixture thus obtained is esterified in the presence of a suitable alcohol and a cationic ion exchange resin.

The alcohol may be selected from any aliphatic monoalcohol as the esterification is not dependent upon the production of any specific type of ester, as the ultimate product, the diol, will be obtained in a subsequent hydrogenation of the ester. It is preferred that the esterifying alcohol be one that is readily available such as methyl alcohol. The alcohol is added in a quantity sufficient to completely esterify the dibasic acid and produce esters of the acyloxy and the hydroxy acids. It is preferred, however, that the alcohol be present in excess of that theoretically required in the esterifying step.

The esterification may be accomplished in the presence of organic solvents and diluents such as benzene, toluene, cyclohexane, xylene, mixtures thereof and the like. The temperatures employed will generally vary from about 70° C. to about 180° C. depending on the reflux temperature of the mixture. Atmospheric, subatmospheric or superatmospheric pressures may be employed as desired. Water formed during the process may be removed from the reaction mixture by any suitable means such as azeotropic distillation with the solvent, if one is used. The reaction is complete for all practical purposes when the distillate contains negligible quantities of water. Upon completion of the esterification, the reaction mass is treated to separate the diesters and hydroxy ester from the ion exchange resin. The last is simply removed by any conventional means such as decanting, centrifuging, or filtering with the last being preferred. The hydroxy ester may, if desired, be separated from the diester by any conventional means such as selective extraction, fractional precipitation or the like.

The hydroxy ester thus separated may be hydrogenated in any suitable manner using any conventional type of hydrogenation apparatus. A method that may be employed comprises placing the ester, a solvent thereof and a hydrogenation catalyst in a pressure resistant vessel equipped with the necessary inlets, outlets, heating means, pressure gauge, thermometer, and desirable means for agitating the contents and subjecting the contents of the vessel to the action of hydrogen gas until absorption of hydrogen is complete.

Temperatures during the hydrogenation may range from about 200° C. to about 300° C. Particularly preferred temperatures range from 200° C. to 250° C. Hydrogen pressures may range from about 2000 to 4000 pounds per square inch with optimum conditions prevailing at pressures of about 4000 p.s.i.

The hydrogenation catalyst may be of any suitable type, such as copper chromite. The amount employed may vary over a considerable range from about 1 to 30% by weight of the reactants but preferably is present in the order of from 1 to 20% by weight.

The overall reactions above described may be represented by the following equation which shows the reaction of cyclohexanone. However, it will be understood that the same general reaction prevails when other cyclic ketones of 4 to 10 carbon atoms are used:

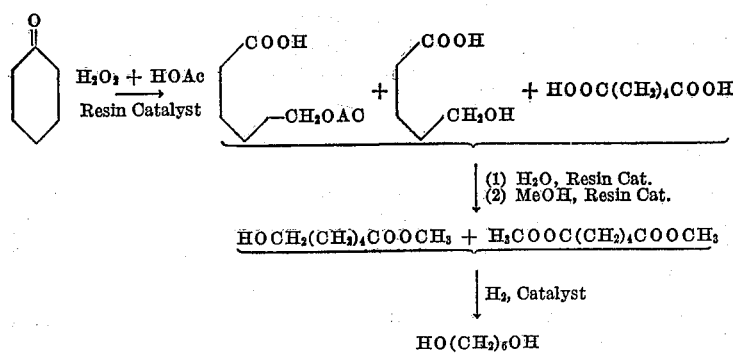

A more detailed description of the process is given by the following examples wherein the reactants are expressed in parts by weight.

Example I

To a reaction vessel equipped with a reflux condenser, agitator, thermometer and heating and cooling means are charged the following:

|  | Parts |
|---|---|
| Acetic acid | 300 |
| 50% $H_2O_2$ | 170 |
| Resin IR-120 | 50 |

The mixture is warmed with constant agitation to 75° C. after which 196 parts of cyclohexanone are added in increments over a period of 60 minutes with cooling applied to maintain the exothermic mixture at about 75–80° C. After the addition of the cyclohexanone is complete, the temperature is maintained at 75–80° C. for 90 minutes. One can determine when the reaction is complete by the periodic titration, iodometrically, of samples from the reaction vessel for the consumption of the hydrogen peroxide. The reaction mixture is then filtered to recover the catalyst. Excess cyclohexanone, water and acetic acid are recovered from the filtrate by flashing through a packed column to a kettle temperature of 165° C. and 5 mm. pressure. A measured portion of the total distillate is added to 2,4-dinitrophenylhydrazine in acidic ethanol to yield the dinitrophenylhydrazone indicating a recovery of 6.5% of the original ketone. Bottoms from the flashing are Claisen-distilled to yield 126 parts of omega-acetoxyhexanoic acid, B.P. 110–140° C. (<1 mm.), $n_D^{20}$ 1.4428, and 138 parts of heavy ends. One part of adipic acid is precipitated from the omega-acetoxyhexanoic acid on standing at room temperature. The yield of acetoxyhexanoic acid is 39%, based on a 93.5% conversion of cyclohexanone. The yield of bottoms is 56% calculated as omega-hydroxyhexanoic acid.

Example II

The procedure of Example I is repeated except that the following proportions are used:

|  | Parts |
|---|---|
| Acetic acid | 420 |
| 50% $H_2O_2$ | 240 |
| Cyclohexanone | 294 |
| Dowex 50 | 50 |

After removal of the resin by filtration, the filtrate is diluted with 500 parts of water and chilled whereupon 5 parts of a cyclic diperoxide identified as 7,8,15,16-tetroxadispiro(5.2.5.2.)hexadecane precipitates. The filtrate from the removal of the diperoxide is flashed through a distillation column at a temperature of 150° C. and 5 mm. Analysis of the total distillate indicates a recovery of 8% of the cyclohexanone charged. 388 parts of the bottoms from the flashing operation are hydrolyzed by boiling with 1000 parts of water in presence of 50 parts of the cationic exchange resin IR-120 for a few hours. Thereafter the resin is filtered off and the filtrate is concentrated to constant weight which is thereafter esterified by boiling in 900 parts of methanol in the presence of 100 parts of the resin IR-120. Substantially complete conversion of the bottoms to dimethyl ester is obtained after three successive esterifications. The weight of the ester thus obtained is 335 parts and corresponds to an 81% yield, based on a 92% conversion of cyclohexanone, of product having an analysis which is in substantial agreement for a mixture containing 86% by weight of omega-hydroxyhexanoate and 14% by weight of dimethyl adipate:

|  | Found | Theory 86% $C_7H_{14}O_3$ 14% $C_8H_{14}O_4$ |
|---|---|---|
| C | 56.3 | 57.1 |
| H | 9.5 | 9.4 |
| Ester value | 0.76 eq./100 g | 0.75 eq./100 g. |
| Hydroxyl value | 0.60 eq./100 g | 0.59 eq./100 g. |

75 parts of the above mixture of dimethyl esters, 40 parts of 2B alcohol and 10 parts of copper chromite catalyst are charged into a hydrogenation vessel pressured to 3000 p.s.i. and heated rapidly to 255° C. with gentle rocking. Hydrogen absorption (1.19 moles; theory, 1.13 moles) is complete in about 5 hours. After cooling and venting the alcoholic solution is filtered to remove the catalyst and the filtrate is then distilled through a packed column to give the following cuts:

|  | Parts |
|---|---|
| Cut I, 85–100° C. (1 mm.) | 9.9 |
| Cut II, 100–105° C. (<1 mm.) | 45.6 |
| Residue | Ca. 1 |
| Column holdup | 4.2 |

Cut I contains 75% by weight of the hydroxy ester (found, 0.51 eq./100 g.), and 26% by weight of 1,6-hexanediol. Cut II is substantially pure 1,6-hexanediol, M.P. 40–41° C. The column holdup is determined by rinsing with acetone and concentrating the solution to constant weight. Cuts I and II represent a 90% conversion of ester to yield 91% of 1,6-hexanediol and the column holdup represents an additional 7% yield calculated as the diol.

Example III

The procedure of Example I is repeated using cyclobutanone in place of the cyclohexanone. The final product is isolated and identified as 1,4-butanediol.

Example IV

The procedure of Example I is repeated using cyclooctanone. It is found that about 4 hours of reaction time is required in order to obtain the maximum yield from the cyclooctanone. The final product is identified as 1,8-octanediol.

We claim as our invention:

1. A process for the oxidation of a cyclic alkanone of 4 to 10 carbon atoms which comprises cleaving the cyclic ring of said alkanone to form in high yield products esterifiable with an alcohol to esters of omega-hydroxy- and omega-acyloxy-monocarboxylic acids having in the acid chain the same number of carbon atoms as the starting cyclic alkanone by treating said cyclic alkanone with a lower fatty peracid in the presence of a cationic ion exchange resin of the sulfonic acid type at a temperature within the range of 40° to 100° C.

2. The process of claim 1 in which the ion exchange resin is selected from the group consisting of sulfonated cross-linked polystyrene condensate, sulfonated polystyrene condensate, modified phenol-formaldehyde sulfonic acid condensate, sulfonated phenol-formaldehyde condensate, and polystyrene-sulfonic acid condensate.

3. The process of claim 1 in which the cationic exchange resin is sulfonated cross-linked polystyrene condensate.

4. The process of claim 1 in which the cationic exchange resin is sulfonate polystyrene condensate.

5. The process of claim 1 in which the cationic exchange resin is modified phenol-formaldehyde sulfonic acid condensate.

6. The process of claim 1 in which the cationic exchange resin is sulfonated phenol-formaldehyde condensate.

7. The process of claim 1 in which the cationic exchange resin is polystyrene-sulfonic acid condensate.

8. A process for the oxidation of cyclohexanone which comprises cleaving the cyclohexanone ring and forming in high yields products esterifiable with an alcohol to esters of omega-hydroxy- and omega-acyloxy-hexanoic acids by treating said cyclohexanone at a temperature within the range of about 70° to about 80° C. with a lower fatty peracid in the presence of a cationic ion exchange resin of the sulfonic acid type.

9. The process of claim 8 in which the peracid is peracetic acid.

References Cited in the file of this patent

UNITED STATES PATENTS

| | | |
|---|---|---|
| 2,291,211 | Cavanaugh | July 28, 1942 |
| 2,617,835 | Curtin | Nov. 11, 1952 |
| 2,714,602 | Abbott | Aug. 2, 1955 |

OTHER REFERENCES

Robinson et al.: J. Chem. Soc. (London) (1937), pp. 371–4.

Sussman: Ind. Eng. Chem., 38, 1228–30 (1946).

Friess: J. Am. Chem. Soc., 71, 2571–5 (1949).

Swern: "Organic Peracids," Chem. Reviews, vol. 45, 1949, pages 1 to 3.

Japan Pat. M155,800, Chem. Abstract 44 (1950), p. 3009.

Fox et al.: J. Am. Chem. Soc., 73 (1951), pp. 4979–80.

Houben-Weyl: "Die Methoden der Organischen Chemie," vol. VIII, Oxygen Compounds III, 1952, p. 69.

Rodd: "Chemistry of Carbon Compounds," vol. I, part B, 1952, pp. 798–9.